United States Patent
Mabille et al.

(10) Patent No.: US 8,097,165 B2
(45) Date of Patent: Jan. 17, 2012

(54) ELIMINATING NATURAL ORGANIC CONTAMINANTS FROM LIQUIDS

(75) Inventors: Caroline Mabille, Sevran (FR);
Jean-Francois Sassi, Ploubazlanec (FR);
Vincent Monin, Plainsboro, NJ (US);
Yves Mottot, Puteaux (FR)

(73) Assignee: Rhodia Operations, Aubervilliers Cedex (FR)

( * ) Notice: Subject to any disclaimer, the term of this patent is extended or adjusted under 35 U.S.C. 154(b) by 714 days.

(21) Appl. No.: 11/630,718

(22) PCT Filed: Jun. 28, 2005

(86) PCT No.: PCT/FR2005/001637
§ 371 (c)(1),
(2), (4) Date: Sep. 3, 2008

(87) PCT Pub. No.: WO2006/010849
PCT Pub. Date: Feb. 2, 2006

(65) Prior Publication Data
US 2009/0084730 A1    Apr. 2, 2009

(30) Foreign Application Priority Data

Jun. 29, 2004  (FR) .................... 04 07141

(51) Int. Cl.
*C02F 1/28* (2006.01)
(52) U.S. Cl. ........ 210/690; 210/691; 210/192; 210/916; 210/917
(58) Field of Classification Search .......... 210/690–691, 210/192, 916–917
See application file for complete search history.

(56) References Cited

U.S. PATENT DOCUMENTS

| | | | |
|---|---|---|---|
| 3,065,222 A | 11/1962 | Bullock et al. | |
| 4,985,082 A | 1/1991 | Whistler | |
| 5,152,896 A | 10/1992 | Mazet et al. | |
| 6,147,028 A | 11/2000 | Rizzi | |
| 6,432,315 B1 * | 8/2002 | Foster | 210/728 |
| 2003/0177915 A1 * | 9/2003 | Kaki et al. | 99/485 |
| 2004/0011487 A1 * | 1/2004 | Helbling et al. | 162/158 |
| 2004/0112559 A1 | 6/2004 | Du Bourg et al. | |
| 2006/0254737 A1 * | 11/2006 | Anderson et al. | 162/175 |

FOREIGN PATENT DOCUMENTS

| | | |
|---|---|---|
| EP | 0281128 A1 | 9/1988 |
| EP | 0499739 B1 | 8/1992 |
| EP | 1338321 A1 | 8/2003 |
| FR | 2180042 A1 | 12/2001 |
| GB | 1339841 | 12/1973 |

OTHER PUBLICATIONS

Wing et al., "Preparation of Insoluble Cationic Starches and their Use in Heavy Metal Anion Removal", Journal of Applied Polymer Science, May 1978, pp. 1405-1416, vol. 22, No. 5, John Wiley & Sons, Inc.
Patent Abstracts of Japan, "Decoloration of Colored Waste Water", JP 07 008972, Jan. 13, 1995, vol. 1995, No. 4.

* cited by examiner

*Primary Examiner* — Chester Barry
(74) *Attorney, Agent, or Firm* — Buchanan Ingersoll & Rooney, P.C.

(57) ABSTRACT

Modified and insoluble starches are utilized for eliminating natural organic substances/contaminants from liquids and in particular from liquids used for food applications, such as drinking water, beverages, fruit juices or syrups, as well as natural water, industrial process water, or wastewater.

25 Claims, No Drawings

ELIMINATING NATURAL ORGANIC CONTAMINANTS FROM LIQUIDS

CROSS-REFERENCE TO PRIORITY/PCT APPLICATIONS

This application claims priority under 35 U.S.C. §119 of FR 0407141, filed June 29, 2004, and is a continuation of PCT/FR 2005/001637, filed June 28, 2005 and designating the U. S. (published in the French language on Feb. 2, 2006, as WO 2006/010849 A1; the title and abstract were published in English), each hereby expressly incorporated by reference in its entirety and each assigned to the assignee hereof.

The invention relates to the use of modified insoluble starch for eliminating natural organic substances in liquids and in particular liquids intended for consumption such as drinking water, beverages, fruit juices or syrups, and also natural waters, industrial waters or wastewater.

The natural organic matter in water may cause many problems. It is responsible for the degradation of the organoleptic properties of drinking water, i.e. the taste, the color or the odor of the water. It may cause bacterial reviviscence or generate potentially toxic by-products of disinfection.

Elimination of the natural organic matter present in water is thus an essential objective for ensuring the quality of the drinking water produced from natural waters. In France, Decree No. 2001-1220 of 20 Dec. 2001 sets the quality reference for the total organic carbon (TOC) of a water intended for human consumption, to a value of 2.0 mg/l.

Moreover, natural organic substances present in beverages or in liquid compositions for consumption such as syrups can modify their properties, in particular their appearance (cloudiness or coloration). This is why it is also important to find a means for removing these natural organic substances that is compatible with the food regulations.

Moreover, it may be necessary to treat industrial waters and in particular waters originating from the agrifood industry or wastewater rich in natural organic matter before discharging them into nature to avoid pollution.

Finally, it may also be necessary to treat natural waters rich in organic substances to convert them into waters for industrial use. Mention may be made especially of the production of water for the agrifood, pharmaceutical or electronic industry.

It was known practice hitherto to use active charcoal, ion-exchange resins or cationic celluloses to eliminate the natural organic substances present in water.

However, the use of active charcoal requires a large amount of active charcoal and is of high cost.

Exchange resins are relatively inefficient. Specifically, it is known in the field of ion exchange that natural organic substances are poisons for resins. The use of exchange resins also makes it necessary to manage an additional effluent associated with the regeneration, which is made necessary on account of the high cost of these products.

The use of cationic celluloses in fibrous form is described in U.S. Pat. No. 5,152,896. The crystalline nature of cellulose in fibrous form is such that only the accessible and modified surface is available for trapping, which limits the maximum adsorption capacity and slows down the exchange kinetics.

Moreover, all the products mentioned previously have the drawback of not efficiently eliminating trihalomethane precursors, which are carcinogenic, and which are present in drinking water.

There is still a need to find a means for eliminating the natural organic substances present in liquids that does not have the drawbacks indicated above, i.e. which is simple to implement, inexpensive and compatible with food applications.

One of the aims of the present invention is also to be able to efficiently treat a drinking water and in particular to eliminate the trihalomethane precursors.

These aims and others are achieved by the present invention, one subject of which is thus the use of optionally modified and optionally insoluble starch for the elimination of natural organic substances in liquids and in particular liquids intended for consumption such as drinking water, beverages, fruit juices or syrups, and also natural waters, industrial waters or wastewater.

No particular limitation is set on the starch used in the invention, and examples of starches that may be used include wheat starch, potato starch, corn starch, sweet potato starch, cassaya starch, tapioca starch, sago starch, rice starch, glutinous corn starch, waxy corn starch and corn starch with a high amylose content, or mixtures thereof.

No particular limitation is set on the purity of the starch. In this sense, natural starch-rich meals may also be used, for instance wheat meal, potato meal, corn meal, rice meal, cassaya meal or tapioca meal, or mixtures thereof.

The term "starch" used hereinbelow denotes both purified starches and natural meals.

The starch may be pretreated for the purpose of lowering the degree of crystallinity of the grains and to make the chains accessible. It may be a pregelatinization process, for instance cooking with hot water or with steam.

The starch is then optionally modified to improve its affinity for the natural organic substances, and thus to improve its capacity to take up the natural organic matter, on the one hand, and to make it insoluble, on the other hand, which allows it to be separated more easily from the liquid solution to be treated.

These modifications intended to improve the affinity of the starch for the natural organic substances, and to make it insoluble, may be performed separately and in the order desired. It may also be possible to perform these modifications simultaneously.

Among the modifications of starch intended to improve its affinity for the natural organic substances, mention may be made of the introduction of cationic or cationizable groups. The term "cationizable groups" means groups that may be made cationic as a function of the pH of the medium.

Among the cationic or cationizable groups that may be mentioned are groups comprising quaternary ammoniums or tertiary amines, pyridiniums, guanidiniums, phosphoniums or sulfoniums.

The cationic modified starches used in the invention may be obtained by conventionally reacting the starch starting materials mentioned above in their native form or after they have undergone the pregelatinization pretreatment mentioned above, for instance steam cooking with a suitable reagent.

The introduction of cationic or cationizable groups into the starch may be performed by means of a nucleophilic substitution reaction.

When it is desired to introduce an ammonium group, the suitable reagent used may be:
  3-chloro-2-hydroxypropyltrimethylammonium chloride, sold under the name Quab 188 by the company Degussa;
  an epoxide bearing a quaternary ammonium such as 2,3-epoxypropyltrimethylammonium chloride sold under the name Quab 151 by the company Degussa or similar compounds;
  diethylaminoethyl chloride;

or Michael acceptors, for instance acrylates or methacrylates bearing quaternary ammoniums or tertiary amines.

The introduction of cationic or cationizable groups into the starch may be performed by esterification with amino acids, for instance glycine, lysine, arginine or 6-aminocaproic acid, or with quaternized amino acid derivatives, for instance betaine hydrochloride.

The introduction of cationic or cationizable groups into the starch may also be performed via radical polymerization comprising the grafting of monomers comprising at least one cationic or cationizable group onto the starch.

The free radical initiation may be performed using cerium, as described in the publication in the European Polymer Journal, Vol. 12, pp. 535-541, 1976. The free-radical initiation may also be performed with ionizing radiation and in particular bombardment with a beam of electrons.

The monomers comprising at least one cationic or cationizable group used to perform this free-radical polymerization may be, for example, monomers comprising at least one ethylenic unsaturation and at least one quaternary or quaternizable nitrogen atom by adjusting the pH.

Among these monomers comprising at least one ethylenic unsaturation and at least one quaternary or quaternizable nitrogen atom by adjusting the pH, mention may be made of the compounds of formulae (I), (II), (III), (IV) and (V) below:

the compound of general formula (I)

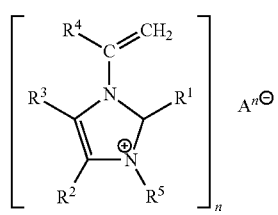

(I)

in which:
$A^{n\ominus}$ represents a $Cl^\ominus$, $Br^\ominus$, $I^\ominus$, $SO_4^{2\ominus}$, $CO_3^{2\ominus}$, $CH_3$—$OSO_3^\ominus$, $OH^\ominus$ or $CH_3$—$CH_2$—$OSO_3^\ominus$ ion,
$R^1$ to $R^5$, which may be identical or different, represent, independently of each other, an alkyl group containing from 1 to 20 carbon atoms, a benzyl radical or an H atom, and
n is 1 or 2, or the compound of general formula (II)

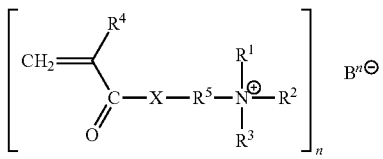

(II)

in which:
X represents an —NH group or an oxygen atom O,
$R^4$ represents a hydrogen atom or an alkyl group containing from 1 to 20 carbon atoms,
$R^5$ represents an alkylene group containing from 1 to 20 carbon atoms,
$R^1$, $R^2$ and $R^3$, which may be identical or different, represent, independently of each other, an alkyl group containing from 1 to 20 carbon atoms, $B^{n\ominus}$ represents a $Cl^\ominus$, $Br^\ominus$, $I^\ominus$, $SO_4^{2\ominus}$, $CO_3^{2\ominus}$, $CH_3$—$OSO_3^\ominus$, $OH^\ominus$ or $CH_3$—$CH_2$—$OSO_3^\ominus$ ion, and
n is 1 or 2, or the compound of general formula (III)

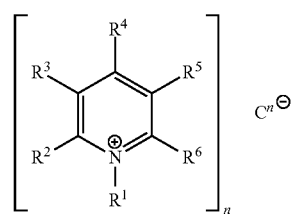

(III)

in which:
$R^1$ to $R^6$, which may be identical or different, represent, independently of each other, a hydrogen atom or an alkyl group containing from 1 to 20 carbon atoms, but with one of the groups $R^1$ to $R^6$ representing a —CH=$CH_2$ group,
$C^{n\ominus}$ represents a $Cl^\ominus$, $Br^\ominus$, $I^\ominus$, $SO_4^{2\ominus}$, $CO_3^{2\ominus}$, $CH_3$—$OSO_3^\ominus$, $OH^\ominus$ or $CH_3$—$CH_2$—$OSO_3^\ominus$ ion, and
n is 1 or 2, and the compound of general formula (IV)

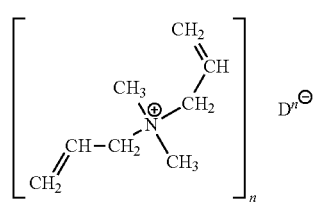

(IV)

in which:
$D^{n\ominus}$ represents a $Cl^\ominus$, $Br^\ominus$, $I^\ominus$, $SO_4^{2\ominus}$, $CO_3^{2\ominus}$, $CH_3$—$OSO_3^\ominus$, $OH^\ominus$ or $CH_3$—$CH_2$—$OSO_3^\ominus$ ion, and
n is 1 or 2.

Preferably, the monomers comprising at least one ethylenic unsaturation and at least one quaternary or quaternizable nitrogen atom are chosen from:
2-dimethylaminoethyl acrylate (DAEA),
quaternized 2-dimethylaminoethyl acrylate (DAEA-Quat),
2-dimethylaminoethyl methacrylate (DMAEMA),
quaternized 2-dimethylaminoethyl methacrylate (DMAEMA-Quat),
2-diethylaminoethyl methacrylate quaternized in chloride form, known as Pleximon 735 or TMAE MC 80 by the company Röhm,
diallyldimethylammonium chloride (DADMAC),
trimethylammoniumpropylmethacrylamide in chloride form, known as MAPTAC, or
mixtures thereof.

The cationic modified starch may contain cationic or cationizable units derived from a chemical transformation after polymerization of monomers that are precursors of cationic or cationizable functions. Examples that may be mentioned include poly(p-chloromethylstyrene), which, after reaction with a tertiary amine such as a trimethylamine, forms quaternized poly(para-trimethylaminomethylstyrene).

The cationic or cationizable units are combined with negatively charged counterions. These counterions may be chosen from chloride, bromide, iodide, fluoride, sulfate, methyl sulfate, phosphate, hydrogen phosphate, phosphonate, carbonate, hydrogen carbonate and hydroxide ions.

Counterions chosen from hydrogen phosphates, methyl sulfates, hydroxides and chlorides are preferably used.

The degree of substitution of the cationic modified starches used in the invention is at least 0.01 and preferably at least 0.1.

If the degree of substitution is less than 0.01, the efficacy of the elimination of the natural organic matter from the liquid to be treated is reduced.

If the degree of substitution exceeds 0.1, the starch inevitably swells in the liquid. In order to be able to use a modified starch substituted to a degree of greater than 0.1, it is preferable to subject it to a modification to make it insoluble. These modifications are described later.

The degree of substitution of the cationic modified starch corresponds to the mean number of cationic charges per sugar unit.

Among the modifications of starch intended to improve its affinity for the natural organic substances, mention may also be made of the introduction of groups bearing an anionic or anionizable charge.

The anionic modified starch that is used in the invention may be obtained by conventionally reacting the starches mentioned above with an anionizing agent such as propane sultone, butane sultone, monochloroacetic acid, chlorosulfonic acid, maleic anhydride, succinic anhydride, citric acid, sulfates, sulfonates, phosphates, phosphonates, orthophosphates, polyphosphates or metaphosphates, and the like.

The degree of substitution of the anionic modified starches used in the invention is at least 0.01 and preferably at least 0.1.

If the degree of substitution is less than 0.01, the efficacy of the implementation of the elimination of the natural organic matter from the liquid to be treated is reduced.

If the degree of substitution exceeds 0.1, just as in the case of the cationic modified starches, the starch inevitably swells in the liquid, and, in the same manner as in the case of the cationic modified starches, in order to be able to use a modified starch substituted to a degree of greater than 0.1, it is preferable to subject it to a modification to make it insoluble. These modifications are described later.

The degree of substitution of the anionic modified starch corresponds to the mean number of anionic charges per sugar unit.

Among the modifications of starch intended to improve its affinity for the natural organic substances, mention may be also be made of the introduction of uncharged hydrophilic or hydrophobic groups.

Among the hydrophilic groups that may be introduced, mention may be made especially of one or more saccharide or oligosaccharide residues, one or more ethoxy groups, one or more hydroxyethyl groups, and one or more oligoethyleneoxide groups.

Among the hydrophobic groups that may be introduced, mention may be made especially of an alkyl, aryl, phenyl, benzyl, acetyl, hydroxybutyl or hydroxypropyl group, or a mixture thereof.

The term "alkyl or aryl or acetyl radical" means alkyl or aryl or acetyl radicals containing from 1 to 22 carbon atoms.

The degree of substitution of the starches modified with uncharged hydrophilic or hydrophobic groups used in the invention is at least 0.01 and preferably at least 0.1.

The degree of substitution of the starch modified with uncharged hydrophilic or hydrophobic groups corresponds to the mean number of uncharged hydrophilic or hydrophobic groups per sugar unit.

It is possible to perform several of the modifications proposed above for increasing the affinity of the starch with respect to natural organic substances on the same starch.

Among the modifications of starch intended to make it insoluble, mention may be made especially of the possibility of performing chemical crosslinking of the starch, either by chemically or physically adsorbing it onto a water-insoluble mineral or organic support, or by exploiting its natural crystallinity. When the natural crystallinity of the starch does not allow the final product to have a mass fraction of soluble organics of less than 10%, then the starches are also chemically crosslinked so as to satisfy this criterion.

Preferably, chemical crosslinking of the starch is used to make it insoluble.

Chemical crosslinking of the starch may be obtained via the action of a crosslinking agent chosen from formaldehyde, glyoxal, halohydrins such as epichlorohydrin or epibromohydrin, phosphorus oxychloride, polyphosphates, diisocyanates, bis(ethyleneurea), polyacids such as adipic acid or citric acid, acrolein, and the like.

The chemical crosslinking of the starch may also be obtained via the action of a metallic complexing agent, for instance zirconium (IV).

The chemical crosslinking of the starch may also be obtained under the effect of an ionizing radiation.

The degree of insolubilization of the starch is satisfactory when the mass fraction of soluble organics in the starch is less than 10%.

As indicated previously, the modifications intended to improve the affinity of the starch for the natural organic substances, and the modifications intended to make it insoluble, may be performed separately and in the order desired. It may also be possible to perform these modifications simultaneously.

As examples in which the modifications of the starch are performed simultaneously, mention may be made of an insoluble cationic starch obtained by placing the starch in contact with excess epichlorohydrin and a trimethlyamine. The epichlorohydrin generates in situ a reagent bearing a quaternary ammonium, which will make it possible to render the starch cationic, on the one hand. The excess epichlorohydrin makes it possible, on the other hand, to crosslink the starch.

The optionally modified and optionally insoluble starch of the invention may be used in the form of a powder or alternatively may be formed into granules.

The chemical crosslinking reaction may be exploited to obtain insoluble granules.

The optionally cationic starches may be formed by granulation during the crosslinking reaction in order to obtain insoluble particles of the order of a millimeter (for example between 200 µm and 5 mm), which makes it possible to separate them easily from the water to be treated.

In an industrial installation, these granulated products have the advantage of being able to be used in a column, in the same manner as exchange resins, thus offering a large area for exchange and increased retention capacity.

One method for preparing the granulated crosslinked cationic starches is given in the examples below.

It is possible to use the optionally modified and optionally insoluble starch of the invention alone or as a mixture with other agents for trapping natural organic substances, for instance exchange resins, active charcoal or cationic celluloses.

Among the possible combinations, the preferred combination is that of an optionally modified and optionally insoluble starch of the invention with active charcoal.

The mass fraction of starch in the mixture may be between 5-95% and, reciprocally, the mass fraction of active charcoal may be between 95-5%.

Preferably, the mass fraction of starch in the mixture may be between 40-60% and, reciprocally, the mass fraction of active charcoal may be between 60-40%.

It is also possible to mix the optionally modified and optionally insoluble starch of the invention with inert fillers such as polymer powder or sand to ballast it.

The elimination of the natural organic substances present in the liquid is performed by introducing the optionally modified and optionally insoluble starch of the invention into the liquid to be treated, with stirring for the necessary duration, which is between a few minutes and a few hours, followed by removing from the treated liquid the starch onto which the natural organic substances have been adsorbed, by means of an operation such as separation by centrifugation, filtration including membrane filtration, sedimentation or the like.

In addition, a sequential treatment with active charcoal may be used, for example.

In particular, as indicated in the examples presented below, the combination of a treatment with starch and of a treatment with active charcoal in particular allows the complementary elimination of natural organic substances.

The optionally modified and optionally insoluble starch of the invention has the advantage of efficiently eliminating trihalomethane precursors.

The natural organic matter present in water results mainly from the total or partial decomposition of plants, animals and microorganisms. It is naturally present in natural waters, but its amounts and characteristics are different depending on the sources of water under consideration (lakes, rivers, underground waters, stream, ocean), their geographical location and the season.

It is, however, possible to give mean values of concentrations of natural organic matter encountered in waters intended for the production of drinking water: for a surface water, the concentration ranges from 2 to 10 mg/l for the total organic carbon (TOC); whereas for an underground water, the mean value of the total organic carbon (TOC) is between 0.5 and 1.0 mg/l.

The nature of the natural organic matter varies from one water course to another. This finding implies that the chemical characterization of the natural organic matter may be difficult to generalize.

In general, it is considered that natural organic matter is divided into two separate categories: the hydrophobic matter (humic and fulvic acids) and the hydrophilic matter (proteins, carbohydrates, amino acids and peptides).

Humic acids are the compounds which, in natural organic matter, have the highest molecular weight. This is mainly due to the high concentration of aromatic carbon relative to the concentration of carboxylic acids and carbonyls.

Fulvic acids are of lower molecular weight than humic acids. Their aromatic carbon concentration is lower than that of humic acids.

However, the concentrations of carbonyl and of carboxylic acids in fulvic acids are higher than those in humic acids. Fulvic acids represent the major fraction of natural organic matter (i.e. close to 50%) compared with the fraction of humic acids, which is about 5%.

The natural organic matter present in water may also comprise algal toxins. These are organic molecules synthesized by bacteria. Among these algal toxins, mention may be made of dermatotoxins, neurotoxins and hepatotoxins. Among the hepatotoxins, mention may be made of microcystins and in particular microcystin-LR. These algal toxins may cause organoleptic problems, but they may especially result in health problems. This is especially the case for hepatotoxins and in particular for microcystin-LR.

The natural organic matter present in beverages, fruit juices and syrups is well known to those skilled in the art.

Mention may be made, for example, in the case of sweetened beverages, of sugar colorants, which are macromolecules in the form of hydrophobic carbon-based chains with a hydrophilic end at their weak acid function.

The organic matter present in industrial effluents depends on the industrial processes in which the water has been used.

Among the organic matter present in industrial effluents, mention may be made especially of "manufacturing" dyes or natural dyes. Reference may be made to the document entitled "couplage de décoloration et de la nanofiltration des éluats de régénération en raffinerie de canne [coupling of decolorization and nanofiltration of regeneration eluates in sugar cane refinery]" AVH association, 6th Symposium, Reims, March 1999.

The cationic modified starch or the cationic modified starch made insoluble is used when the liquid to be treated contains natural organic substances that have anionic or anionizable substituent groups, for example phenols, phenoxides, carboxylic acids, carboxylates, phosphates, sulfates or hydrogen sulfides.

The anionic modified starch or the anionic modified starch made insoluble is used when the liquid to be treated contains natural organic substances that have cationic or cationizable groups, for example amines or ammonium groups.

The starch modified with uncharged hydrophilic groups or the starch modified with uncharged hydrophilic groups and made insoluble is used when the liquid to be treated contains natural organic substances that have hydrophilic groups, for example saccharide or oligosaccharide residues.

The starch modified with uncharged hydrophobic groups or the starch modified with uncharged hydrophobic groups and made insoluble is used when the liquid to be treated contains natural organic substances that have hydrophobic groups, for example alkyl, phenyl, benzyl, acetyl, hydroxybutyl or hydroxypropyl groups.

In addition, two or more of the abovementioned types of starch and/or of modified starch may be used, in the form of a mixture of two or more types, or alternatively they may be used together.

The amount of modified starch that is added may be selected in an appropriate manner as a function of the concentration of natural organic substances in the liquid to be treated and of the exchange capacity of the modified starch.

The modified starch of the invention is also useful for eliminating organic substances contained in urines.

The examples that follow are given as nonlimiting illustrations.

EXAMPLES

A—Examples of Preparation of the Starches of the Invention

1) Starch Powder

Example A-1

Starch A: Synthesis of an Insolubilized Cationic Starch 250 ml of demineralized water and 1.2538 g of sodium hydroxide pellets are placed in a jacketed cylindrical 1 liter reactor equipped with a mechanical stirrer of anchor type, a dropping funnel and a condenser. The assembly is placed under a nitrogen atmosphere and stirred at 100 rpm. Once the sodium hydroxide has dissolved, 50.053 g of soluble starch powder are introduced into the reactor without heating. The assembly is heated to 60° C. (jacket temperature) by circulation of hot water. Once the temperature has been reached, it is maintained for one hour with stirring. 99 ml of Quab 151 (70% solution of epoxypropyltrimethylammonium chloride in water, sold by Degussa AG) are then added dropwise over 20 minutes. Once the addition is complete, the reactor is maintained at a temperature of 60° C. with stirring for 6 hours. After cooling to room temperature, the pH of the reaction medium is returned to 7 by adding 0.1 N hydrochloric acid solution. The reaction medium is then poured into 4 liters of absolute ethanol and stirred using a homogenizer of Ultra-Turrax type. The precipitated polymer is retained by filtration on a No. 3 sinter funnel, redispersed in 2 liters of ethanol, refiltered and dried for 16 hours at 50° C. in an oven under vacuum compensated to 20 mbar with nitrogen U.

After drying, 57.38 g of a water-soluble white powder that precipitates in the presence of an anionic surfactant such as sodium dodecyl sulfate (SDS) are obtained. This particular behavior reveals that the introduction of cationic charges onto the polymer has indeed taken place.

The elemental analysis shows that the cationized starch contains 4% nitrogen, which corresponds to a degree of cationic substitution of 0.8.

For the insolubilization by chemical crosslinking, 16.67 g of cationic starch powder obtained in the preceding step are placed in a reactor containing 135 ml of isopropyl alcohol (2-propanol). The reaction medium is stirred for 3 minutes at 100 rpm under a nitrogen atmosphere. 6 ml of 50% sodium hydroxide solution are then added, followed, after 3 minutes, by addition of 3.9 ml of epibromohydrin. The mixture is maintained at 60° C. for 1 hour and then cooled. After cooling to room temperature, 310 ml of demineralized water are added to the reactor, which is stirred for 2 hours, then the stirring is stopped and the mixture is left to stand for 2 hours to allow the solid to settle out. The supernatant is removed by suction using a filter-tipped cannula, and 300 ml of demineralized water are then reintroduced into the reactor. The reaction medium is returned to pH 6 by adding 1 N hydrochloric acid. It is then stirred for 2 hours. The solid+liquid mixture is then filtered through a No. 3 sinter funnel. The filter cake is taken up in 1 liter of demineralized water heated to 70° C. with vigorous stirring for 2 hours, after which time the stirring is stopped and the mixture is left to settle. The supernatant is removed by suction using a filter-tipped cannula. The operation of washing by redispersion in 1 liter of demineralized water, settling and removal of the supernatant is repeated 4 times with cold water.

After the final wash, the solid that settles out is separated out and then frozen and dried by freeze-drying. 15 g of very aerated white powder that impregnates easily into water but does not dissolve are obtained.

Example A-2

Starch B: Synthesis of an Insolubilized Cationic Starch 75 ml of demineralized water, and then 750 mg of sodium chloride and 50 g of waxy corn starch are placed in a jacketed cylindrical 1 liter reactor equipped with a mechanical stirrer of anchor type, a dropping funnel and a condenser. The assembly is placed under a nitrogen atmosphere and stirred at 100 rpm. 5.2 ml of epibromohydrin are introduced with stirring for 3 minutes, followed by addition of 3 g of sodium hydroxide pellets dissolved in 20 ml of demineralized water. The reaction medium takes a very viscous pasty appearance. The stirring is then stopped and the mixture is left to react at rest at room temperature (25° C.) for 16 hours. After this time, the reaction mass has become brittle. A solution of 23 g of sodium hydroxide pellets in 60 ml of demineralized water is added and the mixture is stirred at 100 rpm. The paste disintegrates and becomes dispersed in the liquid. After 30 minutes, the reaction medium is heated to 65° C. Once this temperature has been reached, 90 ml of Quab 188 (chlorohydroxypropyltrimethylammonium chloride at 69% in water, sold by Degussa AG) are added dropwise over 30 minutes. Once the addition is complete, the reactor is maintained at a temperature of 60° C. with stirring for 2 hours. The stirring is then stopped and the mixture is allowed to cool to room temperature. It is left to stand for 2 hours to allow the solid to settle out. The supernatant is removed by suction using a filter-tipped cannula and 600 ml of demineralized water are then reintroduced into the reactor. The reaction medium is returned to pH 6 by adding 1 N hydrochloric acid. It is then stirred for 2 hours. The solid+liquid mixture is then filtered through a No. 3 sinter funnel. The filter cake is taken up in 1 liter of demineralized water heated to 70° C. with vigorous stirring for 2 hours, after which time the stirring is stopped and the mixture is left to settle. The supernatant is removed by suction using a filter-tipped cannula. The operation of washing by redispersion in 1 liter of demineralized water, settling and removal of the supernatant is repeated 4 times with cold water. After the final wash, the solid that settles out is separated out and then frozen and dried by freeze-drying.

60 g of very aerated white powder that impregnates easily into water but does not dissolve are obtained.

The elemental analysis on nitrogen shows that this product has a cationic DS of 0.12.

Example A-3

Starch C: Synthesis of an Insolubilized Cationic Starch

The procedure is identical to that of Example A-2, except that the starting material is normal corn starch and that the final product is dried in a vacuum oven at 50° C.

55.27 g of white powder that impregnates easily into water but does not dissolve are obtained.

The elemental analysis on nitrogen shows that this product has a cationic DS of 0.15.

2) Starch Granules

Method for preparing granulated crosslinked cationic starches

Example A-4

Starch G1

20 g of cationic starch Hi-Cat 1574A sold by the company Roquette Frères are placed in a high-walled 250 ml beaker. 5 g of demineralized water are then added at room temperature to the powder and the mixture is then homogenized manually using a plastic spatula. Under the action of the humidity and stirring, granules are formed. 2 g of 98% epibromohydrin (Sigma Aldrich) are then added, still at room temperature, and the mixture is homogenized again using the spatula. Finally, 7.5 g of an aqueous solution containing 30% by mass of NaOH are added, still at room temperature. The mixture is homogenized once again using the plastic spatula. The beaker is covered with a stretchable film (Parafilm) and placed in a thermostatic bath at 60° C. The stretchable film is removed regularly to enable stirring of the contents of the beaker using a spatula. The beaker is removed from the thermostatic bath after 1 hour.

After this reaction step, the granules obtained are washed. 10 g of product are placed in a 400 ml beaker containing 100 ml of demineralized water. The mixture is stirred for 5 minutes using a magnetic stirrer and the solid is then recovered by filtration (filter paper on a Buchner funnel). Washing is repeated twice so as to wash the product 3 times in total. The washed solid is then dried in a vacuum oven (about 30 mmHg, 40° C.) for 24 hours. 5.6 g of solid are obtained, i.e. a recovery yield of 97%, relative to the 6.03 g of insoluble solids initially contained in the 10 g of product subjected to washing. The Starch G1 sample contains 1.18% of nitrogen (of the dry extract, determined by the Kjeldhal method), which corresponds to a degree of cationic substitution of about 0.14.

Example A-5

Starch G2

500 g of cationic starch Hi-Cat 1574A sold by the company Roquette Frères are placed in 5 liter plowshare mixer. The mixer is switched on (speed regulator set at 4) in order to fluidize the bed of powder. 25 g of water are sprayed onto the powder over 1 minute, followed by 100 g of an aqueous solution containing 32% by mass of NaOH, over 2 minutes. Finally, 50 g of 98% epibromohydrin (Sigma Aldrich) are sprayed, still at room temperature, over 2 minutes. 15 minutes after switching on the mixer, the speed regulator is set to 3 and water from a thermostatic bath at 63° C. is circulated in the mixer jacket. 18 minutes after switching on the mixer, water is added regularly (235 g in total) by spraying so as to improve the granulation. 1 hour 25 minutes after switching on the mixer, water at room temperature is circulated in the mixer jacket, to cool the product. 1 hour 28 minutes after switching on the mixer, the product is at 42° C., and stirring is stopped to remove it.

After this reaction step, the product obtained is washed. 91 g of product (corresponding to 50 g of cationic starch Hi-Cat 1574A) are placed in a 1 liter beaker containing 500 ml of demineralized water. The mixture is stirred for 5 minutes using a magnetic stirrer and the solid is then recovered by filtration (filter paper on a Buchner funnel). Washing is repeated twice in order to wash the product 3 times in total. The washed solid is then dried in a vacuum oven (about 30 mmHg, 40° C.) for 24 hours. The product obtained is visually insoluble in water. The Starch G2 sample contains 1.18% nitrogen (on the dry extract, determined by the Kjeldhal method), which corresponds to a degree of cationic substitution of about 0.14.

Example A-6

Starch G3

100 g of native corn starch (Roquette Frères) are placed in a food mixer (Braun, model 4142). The stirring speed is adjusted using a voltage regulator to which the mixer is connected, in order to place the powder in motion while taking care not to make it fly out. 25 g of demineralized water are then added slowly at room temperature to the stirred powder, followed by addition of 35.5 g of an aqueous solution containing 32% by mass of NaOH. After mixing for a few seconds, a cohesive granular powder is obtained.

50 g of this mixture (i.e. 31.1 g of native starch) are placed in a 250 ml high-walled beaker and 3.1 g of 98% epibromohydrin (Sigma Aldrich) are added, and the mixture is homogenized using a plastic spatula. The beaker is covered with a stretchable film (Parafilm) and placed in a thermostatic bath at 60° C. The stretchable film is removed regularly to enable stirring of the contents of the beaker using a spatula. After 1 hour, 92.4 g of Reagens S CFZ 65% (aqueous solution containing 65% by mass of 3-chloro-2-hydroxypropyltri-methylammonium chloride, Sachem Europe B.V.) are added. The beaker covered with the stretchable film is left for 2 hours 40 minutes in the thermostatic bath at 60° C., and then overnight at room temperature.

After these reaction steps, the granules obtained are washed. The contents of the beaker are transferred into a 600 ml beaker, to which are added 300 ml of demineralized water. The mixture is stirred for 5 minutes using a magnetic stirrer and the solid is then recovered by filtration (filter paper on a Buchner funnel). Washing is repeated twice, so as to wash the product 3 times in total. After the 3rd wash, the filtration is greatly slowed down by the presence of fine particles (non-crosslinked starch grains). The product is thus washed on a 400 μm screen with about 300 ml of demineralized water. A total of 3 washes are performed on this screen, and the product is then filtered a final time on a Buchner funnel to remove as much water as possible. The product is then dried in a vacuum oven (about 30 mmHg, 40° C.) for 15 hours. 29.5 g of solid containing 8.3% relative humidity are obtained. The Starch G3 sample contains 0.23% nitrogen (on the dry extract), determined by the Kjeldhal method), which corresponds to a degree of cationic substitution of about 0.015.

Efficacy of the Insolubilization

The degree of insolubilization of these 3 samples is satisfactory since, when they are dispersed in ultrapure water in a proportion of 100 mg/l, the carbon content in the supernatant separated out by centrifugation (at 5000 rpm for 15 minutes), is of the order of 0.15 mg/l, i.e. 0.15% of soluble organic compounds. This content of soluble organic compounds is much lower than the recommended 10%.

B—Examples of Evaluation of the Starches of the Invention

In all the examples, the assaying of the natural organic matter is performed either by UV spectrophotometry at 254 nm with a Shimadzu UV-160 model 204-04550 machine, or by assaying of the total organic carbon using a TOC-5000A analyzer from Shimadzu. These measurements are performed after filtering the samples using filters with a Millex syringe in PVDF and of porosity 0.45 μm, prerinsed with ultrapure water.

Example B-1

This test is performed on a natural water from the Rennes region, which has been subjected beforehand to a coagulation/flocculation treatment. 1 mg of crosslinked cationic starch of Example A-1 (Starch A) is placed in a 150 ml Pyrex beaker with 100 ml of water to be treated, with stirring. This experiment is performed at 7° C. For given contact times, the residual concentration of natural organic matter in solution is assayed. The results are presented in Table I.

TABLE I

| Contact time (min) | UV absorbance at 254 nm | Percentage abatement of the UV absorbance at 254 nm |
|---|---|---|
| 2 | 0.172 | 3.4 |
| 10 | 0.159 | 10.7 |
| 20 | 0.154 | 13.5 |
| 30 | 0.155 | 12.9 |
| 60 | 0.151 | 15.2 |
| 190 | 0.148 | 16.9 |
| 430 | 0.149 | 16.3 |
| 1330 | 0.147 | 17.4 |
| Natural water after coagulation/flocculation | 0.178 | |

This test demonstrates the efficacy of the crosslinked cationic starch of Example A-1 for eliminating natural organic matter. Moreover, it shows that the adsorption kinetics are fast, since, after a contact time of 30 minutes, about 75% of the performance obtained at equilibrium is achieved.

Example B-2

This test is performed on a natural water from the Rennes region, which has been subjected beforehand to a coagulation/flocculation treatment. Given amounts of crosslinked cationic starch of Example A-1 (Starch A) are placed in 150 ml Pyrex beakers with 100 ml of water to be treated, with stirring and at a temperature of 7° C. After a contact time of 30 minutes, the residual concentration of natural organic matter in solution is assayed. The results are given in Table II.

TABLE II

| Concentration of cross-linked cationic starch in ppm | Total organic carbon (TOC) in mg/l | Percentage of elimination of the TOC | UV absorbance at 254 nm | Percentage of elimination of the UV absorbance |
|---|---|---|---|---|
| 10 | 1.97 ± 0.10 | 18 | 0.155 ± 0.002 | 19 |
| 25 | 1.85 ± 0.10 | 23 | 0.134 ± 0.002 | 30 |
| 50 | 1.72 ± 0.10 | 28 | 0.124 ± 0.002 | 35 |
| 100 | 1.59 ± 0.10 | 34 | 0.110 ± 0.002 | 43 |
| 200 | 1.29 ± 0.10 | 46 | 0.088 ± 0.002 | 54 |
| Natural water after coagulation/flocculation | 2.40 ± 0.10 | | 0.192 ± 0.002 | |

This example demonstrates the influence of the dose of starch on the elimination of natural organic matter: the higher the dose of starch, the greater the percentage of elimination of the natural organic matter. However, it would appear that the performance reaches a plateau at high doses. This is quite probably associated with the fact that the crosslinked cationic starch does not develop an interaction with all the natural organic matter, but only with a fraction thereof, this fraction being about 50%.

Example B-3

Comparative tests between powdered active charcoal Picactif PCO 15-35 sold by the company PICA, the crosslinked cationic starch of Example A-1 (Starch A) and a mixture of powdered active charcoal-crosslinked cationic starch in a 50%-50% mass proportion are performed.

These tests were performed on a natural water from the Rennes region, which has been subjected beforehand to a coagulation/flocculation treatment. Moreover, each test was repeated at least 5 times.

For each test, 1 mg of the product to be tested is dispersed in 100 ml of water to be treated, with stirring and at a temperature of 7° C., and after a contact time of 30 minutes, the residual concentration of natural organic matter in solution is assayed. The results are given in Table III.

TABLE III

| | Total organic carbon (TOC) mg/l | Percentage of elimination of the TOC | UV absorbance at 254 nm | Percentage of elimination of the UV absorbance |
|---|---|---|---|---|
| Natural water from Rennes after coagulation/flocculation | 2.40 ± 0.10 | | 0.192 ± 0.002 | |
| Powdered active charcoal Picactif PCO 15-35 | 2.10 ± 0.10 | 13% | 0.173 ± 0.002 | 10% |
| Crosslinked cationic starch Starch A | 2.00 ± 0.10 | 17% | 0.150 ± 0.002 | 22% |
| Powdered active charcoal 50% Starch A 50% | 1.95 ± 0.10 | 19% | 0.146 ± 0.002 | 24% |

These tests demonstrate that the crosslinked cationic starch of Example A-1 (Starch A) is more effective than powdered active charcoal for eliminating trihalomethane precursors, since it produces greater abatement of the absorbance of the water. Moreover, its efficacy with respect to the natural organic matter as a whole is similar to that of powdered active charcoal.

Finally, this example also reveals the value of combining the use of crosslinked cationic starch with that of active charcoal for improving the performance of the latter.

Example B-4

Comparative tests between crosslinked cationic starches with variable structural parameters and production methods were performed.

These tests were performed on a natural water from the Rennes region, which has been subjected beforehand to a coagulation/flocculation treatment. For each test, 1 mg of the product to be tested is dispersed in 100 ml of water to be treated, with stirring and at a temperature of 7° C., and after a contact time of 30 minutes, the residual concentration of natural organic matter is assayed. The results are given in Table IV

TABLE IV

| | Total organic carbon (TOC) mg/l | Percentage of elimination of the TOC | UV absorbance at 254 nm | Percentage of elimination of the UV absorbance |
|---|---|---|---|---|
| Natural water from Rennes after coagulation/flocculation | 2.48 ± 0.10 | | 0.193 ± 0.002 | |
| Starch A | 2.17 ± 0.10 | 13% | 0.158 ± 0.002 | 18% |
| Starch B | 2.20 ± 0.10 | 11% | 0.178 ± 0.002 | 8% |
| Starch C | 2.24 ± 0.10 | 10% | 0.182 ± 0.002 | 6% |

This example shows that crosslinked cationic starches, which have different structural parameters and which have been obtained according to different synthetic routes, give equivalent performance in terms of TOC for a working dose of 10 ppm and a contact time of half an hour.

On the other hand, the exceptional nature of the crosslinked cationic starch of Example A-1 (Starch A) for the elimination of trihalomethane precursors should be noted. This specificity is quite probably associated with the greater accessibility of the adsorption sites, which is thought to result from the steam cooking pretreatment that the starch has undergone before being modified.

Example 5

Comparative tests were performed between crosslinked cationic starches with variable structural parameters, production methods and forming methods.

These tests were performed on a natural water from the Rennes region, which has been subjected beforehand to a coagulation/flocculation treatment. For each test, 1 mg of the test product is dispersed in 100 ml of water to be treated, with stirring and at a temperature of 7° C., and after a contact time of 15 hours, the residual concentration of natural organic matter in solution is assayed. The results are given in Table V.

TABLE V

| | UV absorbance at 254 nm | Percentage of elimination of the UV absorbance |
|---|---|---|
| Natural water from Rennes after coagulation/flocculation | 0.170 ± 0.002 | |
| Starch A | 0.140 ± 0.002 | 17.5% |
| Starch C | 0.153 ± 0.002 | 10% |
| Starch G1 | 0.159 ± 0.002 | 6% |
| Starch G2 | 0.156 ± 0.002 | 8% |
| Starch G3 | 0.171 ± 0.002 | 0% |

In this example, the specificity of the crosslinked cationic starch of Example A-1 (starch A) for elimination of the trihalomethane precursors is again found. Moreover, it shows that the granulated cationic starches are effective for eliminating natural organic matter at a dose of 10 ppm once the degree of cationic substitution thereof is sufficiently high (>0.015).

The invention claimed is:

1. A method for eliminating natural organic substances/contaminants from a liquid medium, the method comprising treating the liquid medium with an insoluble, cationic or cationizable starch, thus sorbing such organic substances/contaminants onto such starch, and then ridding the same from the liquid medium thus purified, wherein the cationic or cationizable functional groups are introduced into the starch via free-radical polymerization comprising the grafting of monomers containing at least one cationic or cationizable group onto the starch, and, wherein the monomers comprising at least one cationic or cationizable functional group employed to perform such free-radical polymerization are selected from the group of compounds consisting of formulae (I), (II), (III) and (IV) below:

a compound of general formula (I):

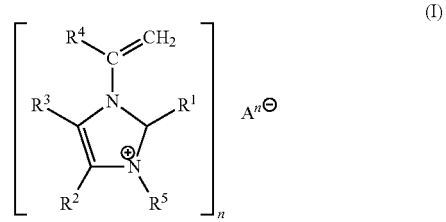

in which:
$A^{n\ominus}$ represents a $Cl^{\ominus}$, $Br^{\ominus}$, $I^{\ominus}$, $SO_4^{2\ominus}$, $CO_3^{2\ominus}$, $CH_3\text{—}OSO_3^{\ominus}$, $OH^{\ominus}$ or $CH_3\text{—}CH_2\text{—}OSO_3^{\ominus}$ ion, $R^1$ to $R^5$, which may be identical or different, are each an alkyl radical having from 1 to 20 carbon atoms, a benzyl radical or an H atom, and n is 1 or 2, or a compound of general formula (II):

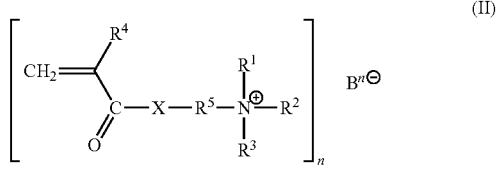

in which:
X represents an —NH group or an oxygen atom O, $R^4$ represents a hydrogen atom or an alkyl radical having from 1 to 20 carbon atoms, $R^5$ represents an alkylene radical having from 1 to 20 carbon atoms, $R^1$, $R^2$ and $R^3$, which may be identical or different, are each an alkyl radical having from 1 to 20 carbon atoms, $B^{N\ominus}$ represents a $Cl^{\ominus}$, $Br^{\ominus}$, $I^{\ominus}$, $SO_4^{2\ominus}$, $CO_3^{2\ominus}$, $CH_3\text{—}OSO_3^{\ominus}$, $OH^{\ominus}$ or $CH_3\text{—}CH_2\text{—}OSO_3^{\ominus}$ ion, and n is 1 or 2, or a compound of general formula (III):

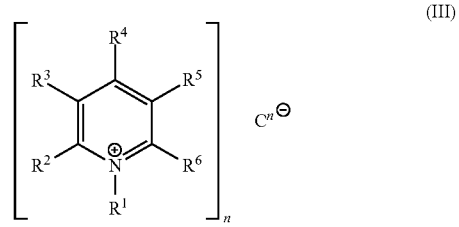

in which:

R$^1$ to R$^6$, which may be identical or different, are each a hydrogen atom or an alkyl radical having from 1 to 20 carbon atoms, with the proviso that one of the groups R$^1$ to R$^6$ is a —CH=CH$_2$ radical, C$^{N\ominus}$ represents a Cl$^\ominus$, Br$^\ominus$, I$^\ominus$, SO$_4^{2\ominus}$, CO$_3^{2\ominus}$, CH$_3$—OSO$_3^\ominus$, OH$^\ominus$ or CH$_3$—CH$_2$—OSO$_3^\ominus$ ion, and n is 1 or 2, and a compound of general formula (IV):

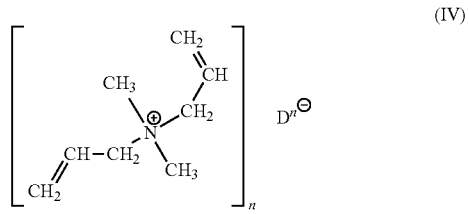

(IV)

in which:

D$^{n\ominus}$ represents a Cl$^\ominus$, Br$^\ominus$, I$^\ominus$, SO$_4^{2\ominus}$, CO$_3^{2\ominus}$, CH$_3$—OSO$_3^\ominus$, OH$^\ominus$ or CH$_3$—CH$_2$—OSO$_3^\ominus$ ion, and n is 1 or 2.

2. The method as defined by claim 1, wherein the starch is selected from the group consisting of wheat starch, potato starch, corn starch, sweet potato starch, tapioca starch, cassava starch, sago starch, rice starch, glutinous corn starch, waxy corn starch, corn starch having a high amylose content and mixtures thereof.

3. The method as defined by claim 1, wherein the starch is subjected to a pregelatinization pretreatment via cooking with hot water or with steam.

4. The method as defined by claim 1, wherein the cationic or cationizable functional groups are selected the from group consisting of quaternary ammoniums or tertiary amines, pyridiniums, guanidiniums, phosphoniums or sulfoniums.

5. The method as defined by claim 1, wherein the cationic or cationizable functional groups are introduced into the starch via a nucleophilic substitution reaction.

6. The method as defined by claim 1, wherein the cationic or cationizable functional groups are introduced into the starch by esterification with an amino acid, or with a quaternized amino acid derivative.

7. The method as defined by claim 1, wherein the monomers comprising at least one cationic or cationizable functional group employed to perform such free-radical polymerization are selected from the group consisting of:

2-dimethylaminoethyl acrylate (DAEA), quaternized 2-dimethylaminoethyl acrylate (DAEA-Quat), 2-dimethylaminoethyl methacrylate (DMAEMA), quaternized 2-dimethylaminoethyl methacrylate (DMAEMA-Quat), 2-diethylaminoethyl methacrylate quaternized in chloride form, indicated as Pleximon 735 or TMAE MC 80, diallyldimethylammonium chloride (DADMAC), trimethylammoniumpropylmethacrylamide in chloride form, indicated as MAPTAC, and mixtures thereof.

8. The method as defined by claim 1, wherein the cationic or cationizable functional groups are combined with negatively charged counterions selected from among chloride, bromide, iodide, fluoride, sulfate, methyl sulfate, phosphate, hydrogen phosphate, phosphonate, carbonate, hydrogen carbonate and hydroxide ions.

9. The method as defined by claim 1, wherein the degree of substitution of the starches modified by introduction of one or more cationic groups is at least 0.01.

10. The method as defined by claim 1, wherein the insoluble starch is obtained by chemical crosslinking of the starch, either by chemically or physically adsorbing it onto a water-insoluble mineral or organic support, and/or via its natural crystallinity.

11. The method as defined by claim 10, wherein the insoluble starch is produced by chemical crosslinking.

12. The method as defined by claim 10, wherein chemical crosslinking of the starch is obtained via the action of a crosslinking agent selected from among formaldehyde, glyoxal, a halohydrin, epichlorohydrin, epibromohydrin, phosphorus oxychloride, a polyphosphate, a diisocyanate, a bis (ethyleneurea), polyacid, adipic acid, citric acid, acrolein or mixture thereof.

13. The method as defined by claim 10, wherein chemical crosslinking of the starch is obtained via the action of a metallic complexing agent.

14. The method as defined by claim 10, wherein chemical crosslinking of the starch is obtained via the influence of an ionizing radiation.

15. The method as defined by claim 10, wherein the crosslinking is performed until the mass fraction of soluble organics in the starch is less than 10%.

16. The method as defined by claim 1, wherein the modified and insoluble starch is employed in the form of a powder or is formed into granules.

17. The method as defined by claim 1, wherein the modified and insoluble starch is mixed with another agent for trapping natural organic substances.

18. The method as defined by claim 17, wherein the modified and insoluble starch is mixed with an inert filler, sand or a polymer powder.

19. The method as defined by claim 1, wherein the natural organic matter comprises algal toxins, and/or hydrophobic matter, humic and fulvic acids and/or hydrophilic matter, proteins, carbohydrates, amino acids or peptides.

20. The method as defined by claim 1, wherein cationic modified starch or a cationic modified starch rendered insoluble is employed when the liquid to be treated contains natural organic substances that have anionic or anionizable substituent groups, carboxylates, phenoxides, phosphates, sulfates, or mixtures thereof.

21. The method as defined by claim 1, wherein the starch comprises a mixture of two or more of the types of starch and/or of modified starch.

22. The method as defined by claim 1, comprising eliminating natural organic substances from drinking water.

23. The method as defined by claim 1, comprising eliminating natural organic substances from a natural water or wastewater.

24. The method defined by claim 1, comprising eliminating natural organic substances from a beverage.

25. The method as defined by claim 1, comprising eliminating organic substances from a urine.

* * * * *